(12) United States Patent
Baldwin

(10) Patent No.: US 8,795,129 B2
(45) Date of Patent: Aug. 5, 2014

(54) AUTOMATIC TRANSMISSION

(75) Inventor: Reid A. Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 445 days.

(21) Appl. No.: 13/150,425

(22) Filed: Jun. 1, 2011

(65) Prior Publication Data

US 2012/0309580 A1    Dec. 6, 2012

(51) Int. Cl.
*F16H 3/62* (2006.01)
*F16H 3/66* (2006.01)

(52) U.S. Cl.
USPC ........................................ 475/296

(58) Field of Classification Search
USPC ................................ 475/269, 296
See application file for complete search history.

(56) References Cited

U.S. PATENT DOCUMENTS

| | | | |
|---|---|---|---|
| 7,226,381 B2 * | 6/2007 | Klemen | 475/275 |
| 7,637,837 B2 * | 12/2009 | Hart et al. | 475/296 |
| 8,002,664 B2 * | 8/2011 | Carey et al. | 475/296 |
| 8,033,946 B2 * | 10/2011 | Hart et al. | 475/275 |
| 8,152,684 B2 * | 4/2012 | Wittkopp et al. | 475/311 |
| 2009/0305837 A1 | 12/2009 | Hiraiwa | |

* cited by examiner

*Primary Examiner* — David D. Le
*Assistant Examiner* — Jacob S Scott
(74) *Attorney, Agent, or Firm* — James Dottavio; MacMillan, Sobanski & Todd, LLC

(57) ABSTRACT

A transmission includes epicyclic gearing including first, second, third and fourth gearsets, each gearset including first, second and third members; a first member of the first gearset and a first member of the second gearset being secured against rotation; and clutches, each clutch selectively opening and closing a drive connection between members of the gearsets.

15 Claims, 2 Drawing Sheets

| | | |
|---|---|---|
| beta1 | 3.400 |
| beta2 | 2.800 |
| beta3 | 2.200 |
| beta4 | 2.000 |

Fig. 2

| | 60 A | 62 B | 64 C | 66 D | 68 E |
|---|---|---|---|---|---|
| Rev | | | X | X | |
| 1st | X | | X | | |
| 2nd | | X | X | | |
| 3rd | | | X | | X |
| 4th | | X | | | X |
| 5th | X | | | | X |
| 6th | | | | X | X |
| 7th | X | | | X | |
| 8th | | X | | X | |

Fig. 3

AUTOMATIC TRANSMISSION

BACKGROUND OF THE INVENTION

1. Field of the Invention

This invention relates generally to a multiple speed automatic transmission for use in motor vehicles and having epicyclic gearsets controlled by clutches.

2. Description of the Prior Art

A current trend in the automotive industry requires that automatic transmissions be able to produce a continually increasing number of speed ratios. This trend requires a generally increasing number of control components, such as clutches to selectively open and closes drive connections among the members of the gearsets and brakes to hold the gearset members against rotation.

Generally, whenever a planetary transmission generates a high torque ratio, especially when producing reverse drive, at least one clutch requires a very high torque capacity.

A need exists in the industry for a transmission capable of producing eight forward speeds and one reverse speed using with only five clutches. Preferably the space required to contain the transmission should be as small as possible and require an optimal number of control elements.

SUMMARY OF THE INVENTION

A transmission includes epicyclic gearing including first, second, third and fourth gearsets, each gearset including first, second and third members; a first member of the first gearset and a first member of the second gearset being secured against rotation; and clutches, each clutch selectively opening and closing a drive connection between members of the gearsets.

The transmission is capable of producing eight forward speeds and one reverse speed using only five clutches, the optimal number.

The large reaction torques in first gear and reverse are transmitted by a fixed connection to the case instead of a clutch.

No clutch transmits more than 1.7 times the input torque.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 2 is a table showing preferred beta ratios of the four gearsets of FIG. 1; and FIG. 3 is a table that shows the engaged and disengaged state of the clutches that control the transmission of FIG. 1.

DESCRIPTION OF THE PREFERRED EMBODIMENT

Figure 1:
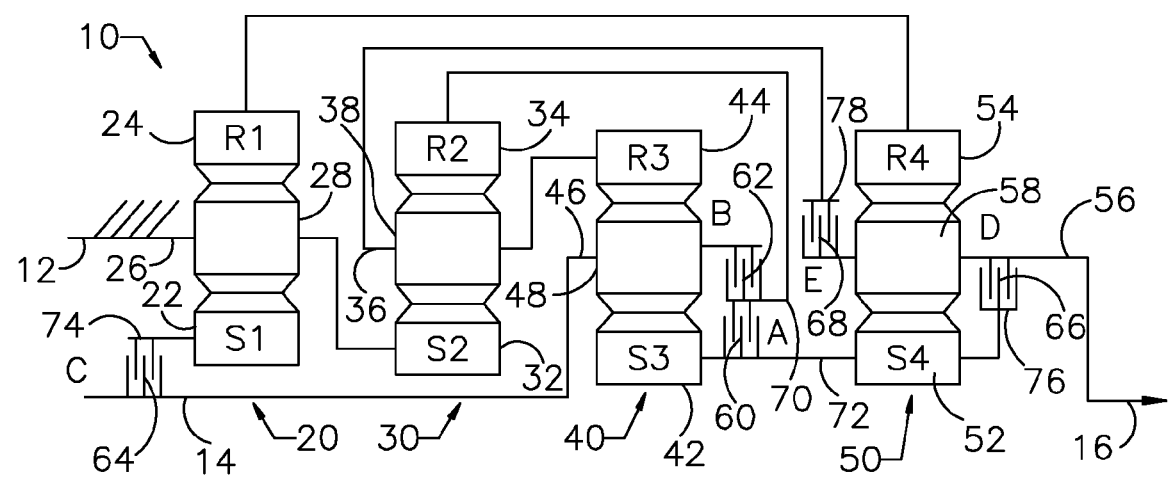
FIG. 1 is a schematic diagram of an automatic transmission having four simple planetary gearsets.

Referring now to the drawings, a transmission 10 is enclosed in a transmission housing 12, which is fixed against rotation to the vehicle structure. An input 14 is driven by a power source, such as an engine or electric motor, preferably through a torque converter or a launch clutch. Alternatively, the input 14 may be driven directly by the engine. An output 16 is driveably connected to the vehicle's wheels, preferably through a differential mechanism and either a set of transfer gears or a drive chain. The transmission includes four epicyclic gearsets 20, 30, 40 and 50. At least one member of each gearset is connected to a member of another of the gearsets.

The first gearset 20 includes a first sun gear 22, first ring gear 24, first carrier 26, and a first set of planet pinions 28, supported for rotation on carrier 26 and meshing with first sun gear 22 and first ring gear 24. Carrier 26 is continuously fixed against rotation, preferably by a connection to the housing 12 or a front support, which is secured to the housing.

The second gearset 30 includes a second sun gear 32, which is secured to first carrier 26; second ring gear 34; second carrier 36; and a second set of planet pinions 38, supported for rotation on second carrier and meshing with second sun gear and second ring gear.

The third gearset 40 includes a third sun gear 42; third ring gear 44, which is secured to the second carrier 36; third carrier 46, which is secured to input shaft 14; and a third set of planet pinions 48, supported for rotation on third carrier and meshing with third sun gear and third ring gear.

The fourth gearset 40 includes a fourth sun gear 52, which is secured to the third sun gear 42; fourth ring gear 54, which is secured to the first ring gear 24; fourth carrier 56, which is secured to output shaft 16; and a fourth set of planet pinions 58, supported for rotation on fourth carrier and meshing with fourth sun gear and fourth ring gear.

The input 14 is secured to the third carrier 46. The first carrier 26 and second sun gear 32 are secured mutually. The first ring gear 24 is secured to the fourth ring gear 54. The third sun gear 42 and the fourth sun gear 52 are secured mutually. The third ring gear 44 and the second carrier 36 are secured mutually. The output 16 is secured to the fourth carrier 56.

A first clutch 60 (A) selectively opens and closes a drive connection, i.e., torque, between the second ring gear 34 and third and fourth sun gears 42, 52.

A second clutch 62 (B) selectively opens and closes a drive connection between the second ring gear 34 and the third carrier 46. A third clutch 64 (C) selectively opens and closes a drive connection between the first sun gear 22 and input 14. A fourth clutch 66 (D) selectively opens and closes a drive connection between the fourth sun gear 52 and the fourth carrier 56. A fifth clutch 68 (E) selectively opens and closes a drive connection between the second carrier 36 and the fourth carrier 56.

A clutch alternately connects and disconnects two rotating components. A brake alternately holds a rotating component against rotation and releases that rotating component so that it can rotate freely. Transmission 10 includes five clutches 60, 62, 64, 66, 68 but no brake.

Clutch 60 (A) comprises plates, splined to a cylinder 70 and alternating with plates that are splined to element 72, which secures the sun gear 42, 52 mutually. When hydraulic pressure is applied to actuate clutch 60 (A), the plates are forced together and torque is transmitted across the clutch. When the hydraulic pressure is released, clutch 60 (A) transmits no torque, allowing the sun gears 42, 52 to rotate independently of ring gear 34.

Clutch 62 (B) comprises plates, splined to a cylinder 70 and alternating with plates that are splined to carrier 46 or a component connected to carrier 46. When hydraulic pressure is applied to actuate clutch 62 (B), the plates are forced together and torque is transmitted across the clutch. When the hydraulic pressure is released, clutch 62 (B) transmits no torque, allowing the carrier 46 to rotate independently of ring gear 34.

Clutch 64 (C) comprises plates, splined to a cylinder 74 and alternating with plates that are splined to input 14. When hydraulic pressure is applied to actuate clutch 64 (C), the plates are forced together and torque is transmitted across the clutch. When the hydraulic pressure is released, clutch 64 (C) transmits no torque, allowing the sun gear 22 to rotate independently of input 14. When clutch 64 (C) is engaged, gearset 20 causes ring gears 24 and 54 to rotate at a lower speed and in a reverse direction relative to the speed and direction of input shaft 14.

Clutch 66 (D) comprises plates, splined to a cylinder 76 and alternating with plates that are splined to carrier 56. When hydraulic pressure is applied to actuate clutch 66 (D), the plates are forced together and torque is transmitted across the clutch. When the hydraulic pressure is released, clutch 66 (D) transmits no torque, allowing carrier 56 to rotate independently of sun gear 52. When clutch 66 (D) is engaged, all three members of the fourth gearset 50 rotate at the same speed.

Clutch 68 (E) comprises plates, splined to a cylinder 78 and alternating with plates that are splined to carrier 56. When hydraulic pressure is applied to actuate clutch 68 (E), the plates are forced together and torque is transmitted across the clutch. When the hydraulic pressure is released, clutch 68 (E) transmits no torque, allowing carrier 36 to rotate independently of carrier 56.

Although clutches 60, 62, 64, 66 and 68 have been illustrated and described as hydraulically actuated multi-plate clutches, the invention may be practiced with alternate types of releasable connections including but not limited to dog clutches, controllable one way clutches, magnetically actuated clutches, or electrically actuated clutches.

Acceptable methods of fixing components to one another include but are not limited to machining from common stock, welds, spline joints, and interference fits. Some lash or torsional compliance between fixed components is permissible.

The only preparation required for forward vehicle motion is engaging clutches 60 and 64. If the launch device is a torque converter, the vehicle will accelerate as soon as the wheel brakes are released. If the launch device is a dedicated launch clutch, forward motion is effectuated by gradually engaging the dedicated launch clutch. All shifts between adjacent gears are accomplished by the coordinated engagement of one clutch and release of another clutch according to the table in FIG. 3. For example, when the vehicle reaches a sufficient forward speed, a shift into second gear is accomplished by releasing clutch 60 and gradually engaging clutch 62.

The transmission is prepared for reverse vehicle motion by engaging clutches 64 and 66. As with forward motion, if the launch device is a torque converter, the vehicle will accelerate as soon as the wheel brakes are released. If the launch device is a dedicated launch clutch, reverse motion is effectuated by gradually engaging the dedicated launch clutch.

Beta for a given gearset is the ratio of the pitch diameter of the ring gear to the pitch diameter of the respective sun gear. When the gearsets 20, 30, 40, 50 have the beta ratios shown in FIG. 2, no clutch 60, 62, 64, 66, 68 transmits more than 1.7 times the torque transmitted by input 14.

In accordance with the provisions of the patent statutes, the preferred embodiment has been described. However, it should be noted that the alternate embodiments can be practiced otherwise than as specifically illustrated and described.

The invention claimed is:

1. A transmission, comprising:
an input;
an output;
epicyclic gearing including first, second, third and fourth gearsets, each gearset including a plurality of members, wherein the members include a sun gear, a ring gear, a carrier, and planet pinions supported on the respective carrier and meshing with the respective sun gear and respective ring gear;
clutches, each clutch selectively opening and closing a drive connection between members of the gearsets;
the input secured to the third carrier, the first carrier and second sun gear fixed against rotation, the second carrier and the third ring being mutually secured, the third and fourth sun gears being mutually secured, the output being secured to the fourth carrier; and
the clutches include a first clutch selectively connecting the second ring gear to the third and fourth sun gears, a second clutch selectively connecting the third carrier to the second ring gear, a fourth clutch selectively connecting two members of the fourth gearset to each other, and a fifth clutch selectively connecting the fourth carrier to the second carrier.

2. The transmission of claim 1 wherein the transmission produces forward gears, each forward gear being produced by engaging two of the clutches.

3. The transmission of claim 1 wherein:
each forward gear is produced by engaging two of the clutches; and
a gear shift between adjacent forward gears is produced by maintaining a first one of said clutches engaged, disengaging a second one of said clutches, and engaging a third one of said clutches.

4. The transmission of claim 3 wherein reverse drive is produced when a third clutch and the fourth clutch are engaged and the first, second and fifth clutches are disengaged.

5. The transmission of claim 1 wherein:
a first forward gear is produced by engaging two of the clutches; and
a shift to reverse gear is produced by maintaining a first one of said clutches engaged, disengaging a second one of said clutches, and engaging a third one of said clutches.

6. The transmission of claim 1 wherein:
the clutches includes a third clutch; and
a first forward gear having the largest gear ratio is produced when the first and third clutches are engaged, a second forward gear having a smaller gear ratio than the first forward gear is produced when the second and third clutches are engaged, a third forward gear having a smaller gear ratio than the second forward gear is produced when the fifth and third clutches are engaged, a fourth forward gear having a smaller gear ratio than the third gear is produced when the second and fifth clutches are engaged, a fifth forward gear having a smaller gear ratio than the fourth forward gear is produced when the first and fifth clutches are engaged, a sixth forward gear having a smaller gear ratio than the fifth forward gear is produced when the fourth and fifth clutches are engaged, a seventh forward gear having a smaller gear ratio than the sixth forward gear is produced when the first and fourth clutches are engaged, and an eighth forward gear having a smaller gear ratio than the seventh forward gear is produced when the second and fourth clutches are engaged.

7. The transmission of claim 1 wherein the clutches includes a third clutch and a reverse drive is produced when the third and fourth clutches are engaged and the first, second and fifth clutches are disengaged.

8. The transmission of claim 7 wherein:
a first forward gear having the largest gear ratio is produced when the first clutch and the third clutch are engaged, a second forward gear having a smaller gear ratio than the first forward gear is produced when the second and third clutches are engaged, a third forward gear having a smaller gear ratio than the second forward gear is produced when the fifth and third clutches are engaged, a fourth forward gear having a smaller gear ratio than the third gear is produced when the second and fifth clutches are engaged, a fifth forward gear having a smaller gear ratio than the fourth forward gear is produced when the first and fifth clutches are engaged, a sixth forward gear having a smaller gear ratio than the fifth forward gear is produced when the fourth and fifth clutches are engaged, a seventh forward gear having a smaller gear ratio than the sixth forward gear is produced when the first and fourth clutches are engaged, and an eighth forward gear having a smaller gear ratio than the seventh forward gear is produced when the second and fourth clutches are engaged.

9. A transmission, comprising:
an input;
an output;
epicyclic gearing including first, second, third and fourth planetary gearsets, each gearset including a plurality of members, wherein the members include a sun gear, a ring gear, a carrier, and planet pinions supported on the respective carrier and meshing with the respective sun gear and respective ring gear;
the input secured to the third carrier, the first carrier and second sun gear fixed against rotation, the second carrier and third ring being mutually secured, the third and fourth sun gears being mutually secured, the output secured to the fourth carrier;
a first clutch selectively connecting the second ring gear to the third and fourth sun gears;
a second clutch selectively connecting the third carrier to the second ring gear;
a fourth clutch selectively mutually connecting two members of the fourth gearset; and
a fifth clutch selectively connecting the fourth carrier to the second carrier.

10. The transmission of claim 9, further comprising:
a fixed connection between the first ring gear and fourth ring gear; and
a third clutch selectively connecting the input to the first sun gear.

11. The transmission of claim 10, wherein the transmission produces eight forward gears, each forward gear being produced by engaging two of the clutches.

12. The transmission of claim 10 wherein:
each forward gear is produced by engaging two of the clutches; and
a gear shift between adjacent forward gears is produced by maintaining a first one of said clutches engaged, disengaging a second one of said clutches, and engaging a third one of said clutches.

13. The transmission of claim 10 wherein:
a first forward gear is produced by engaging two of the clutches; and
a shift to reverse gear is produced by maintaining a first one of said clutches engaged, disengaging a second one of said clutches, and engaging a third one of said clutches.

14. The transmission of claim 9 wherein:
a first forward gear having the largest gear ratio is produced when the first clutch and a third clutch are engaged, a second forward gear having a smaller gear ratio than the first forward gear is produced when the second and third clutches are engaged, a third forward gear having a smaller gear ratio than the second forward gear is produced when the fifth and third clutches are engaged, a fourth forward gear having a smaller gear ratio than the third gear is produced when the second and fifth clutches are engaged, a fifth forward gear having a smaller gear ratio than the fourth forward gear is produced when the first and fifth clutches are engaged, a sixth forward gear having a smaller gear ratio than the fifth forward gear is produced when the fourth and fifth clutches are engaged, a seventh forward gear having a smaller gear ratio than the sixth forward gear is produced when the first and fourth clutches are engaged, and an eighth forward gear having a smaller gear ratio than the seventh forward gear is produced when the second and fourth clutches are engaged.

15. The transmission of claim 9 wherein reverse drive is produced when a third clutch and the fourth clutch are engaged and the first, second and fifth clutches are disengaged.

* * * * *